(12) United States Patent
Suheil et al.

(10) Patent No.: US 12,506,265 B2
(45) Date of Patent: Dec. 23, 2025

(54) COMMUNICATION DEVICE FOR DETERMINING A POSITION OF A COMMUNICATION PARTNER

(71) Applicant: HELLA GmbH & Co. KGaA, Lippstadt (DE)

(72) Inventors: Belal Abu Suheil, Lippstadt (DE); Constantin Kakoyiannis, Neuss (DE); Joerg Schrape, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 116 days.

(21) Appl. No.: 18/593,894

(22) Filed: Mar. 2, 2024

(65) Prior Publication Data
US 2024/0297438 A1 Sep. 5, 2024

(30) Foreign Application Priority Data
Mar. 2, 2023 (DE) ...................... 10 2023 105 143.1

(51) Int. Cl.
| | |
|---|---|
| *H01Q 7/00* | (2006.01) |
| *H01Q 1/38* | (2006.01) |
| *H01Q 1/48* | (2006.01) |

(52) U.S. Cl.
CPC ................ *H01Q 7/00* (2013.01); *H01Q 1/38* (2013.01); *H01Q 1/48* (2013.01)

(58) Field of Classification Search
CPC .. G01S 3/043; G01S 3/48; H01Q 1/24; H01Q 1/3233; H01Q 1/38; H01Q 1/48; H01Q 21/06; H01Q 7/00; H01Q 9/42
See application file for complete search history.

(56) References Cited

U.S. PATENT DOCUMENTS

2013/0169494 A1  7/2013 Hung et al.

*Primary Examiner* — Thien M Le
(74) *Attorney, Agent, or Firm* — Muncy, Geissler, Olds & Lowe, P.C.

(57) ABSTRACT

A communication device for determining a position of a communication partner, wherein the communication device has a first circular antenna, at least one further circular antenna, a circuit board, and a communication module situated at the circuit board. The circuit board includes at least one first copper layer and a second copper layer. The first antenna has a first recess that is formed in the first copper layer, a first ground plane, and a first excitation structure. The at least one further antenna has a further recess that is formed in the first copper layer, a further ground plane, and a further excitation structure. The first ground plane is spaced apart from the further ground plane to electromagnetically decouple the first antenna from the at least one further antenna.

11 Claims, 4 Drawing Sheets

COMMUNICATION DEVICE FOR DETERMINING A POSITION OF A COMMUNICATION PARTNER

This nonprovisional application claims priority under 35 U.S.C. § 119(a) to German Patent Application No. 10 2023 105 143.1, which was filed in Germany on Mar. 2, 2023, and which is herein incorporated by reference.

BACKGROUND OF THE INVENTION

Field of the Invention

The present invention relates to a communication device for determining a position of a communication partner, and to a vehicle.

Description of the Background Art

In vehicle access systems, multiple ultrawide band (UWB) radio modules installed in the vehicle are used for determining the range between mobile devices, for example a mobile telephone or a radio key, and a particular vehicle. The position of the mobile telephone or of the radio key may be determined based on the transmitted radio signals.

The position determination can be measured only via the distance of UWB modules.

As a rule, at least the connection of four vehicle-side UWB modules to a communication partner is necessary for unambiguous position determination.

For example, two receivers with two separate antenna connections that are able to measure a phase difference of the antenna signals between two connections may be used. Thus, for a distance that is less than half the wavelength of the radio signal, based on the phase difference between the two reception signals it is possible to determine the direction of the incident radio wave. For this purpose, the phase difference of the two reception paths as a function of the incidence angle of the radio wave must be a monotonically rising (or falling) function of the incidence angle, and must be independent of the unknown polarization direction of the incident wave.

The phase difference between two antenna connections is referred to below as phase difference of arrival (PDoA).

For theoretical punctiform antennas, PDoA functions very well from a geometric standpoint. In practice, however, the antennas require a certain minimum size in relation to the wavelength of the radio signal in order to achieve good efficiency and attain the necessary minimum bandwidth.

A UWB module with its conductive structures, in particular the ground planes, significantly influences the field propagation in the vicinity of the antennas. Depending on the frequency and polarization of the incident wave, different field and current distributions develop in the structure formed from the antennas and the UWB module, which result in an ambiguous PDoA function. The location of the phase centers of the two antennas thus changes as a function of the incidence angle and the polarization direction of the incident wave. A correction via the incidence angle and the polarization direction is not possible, since neither influencing variable is known beforehand. An unambiguous determination of the incidence angle is thus no longer possible.

Conventional monopole antennas and dipole antennas as well as their inversely structured designs have a monotonic PDoA function only with the appropriate polarization of the incident wave. If the polarization direction deviates therefrom, which is generally the case in practice, the PDoA function becomes ambiguous and the incidence angle can no longer be determined.

SUMMARY OF THE INVENTION

It is therefore an object of the present invention to provide a communication device and a vehicle. Features and details that are described in conjunction with the vehicle according to the invention naturally also apply in conjunction with the communication device according to the invention, and vice versa in each case, so that with regard to the disclosure, reciprocal reference always is or may be made to the individual aspects of the invention.

Against this background, an object of the present invention is to enable a reliable position determination of a communication partner.

Thus, according to a first aspect of the present invention, a communication device, in particular for a vehicle, for determining a position of a communication partner is provided.

The provided communication device can include a first circular antenna, at least one further circular antenna, a circuit board, and a communication module arranged at the circuit board.

The circuit board can include at least one first copper layer and a second copper layer, the first antenna having a first recess that is formed in the first copper layer, a first ground plane, and a first excitation structure, and the at least one further antenna having a further recess that is formed in the first copper layer, a further ground plane, and a further excitation structure, the first ground plane being spaced apart from the further ground plane in order to electromagnetically decouple the first antenna from the at least one further antenna, and the first antenna being electrically coupled to the communication module via a first connecting line formed in a first area of the copper layer, and the at least one further antenna being electrically coupled to the communication module via a further connecting line formed in a further area of the second copper layer.

The provided communication device is based on a plurality of circular, i.e., circularly polarizing, antennas that are electromagnetically separated from one another so that they have only minimal influence on one another, and a precise evaluation of a radio signal received by the antennas is possible.

Correspondingly, the spaced-apart ground planes of the circular antennas of the provided communication device enable a monotonic PDoA function. The PDoA function for the most part is independent of the polarization direction of a particular incident linearly polarized wave.

In addition, due to the spaced-apart ground planes of the circular antennas of the provided communication device, the PDoA function is insensitive to the configuration of the ground plane of the communication device.

Furthermore, an angle of a particular incident wave may be determined in the main X-Y plane of the provided communication device, there being two possible positions of the communication partner. During the installation of the antennas in front of a conductive surface, one of the two half-planes in X-Y plane may be excluded, so that when there is only one radio link, a position determination in the X-Y plane is possible via the measured distance and the incidence angle.

It may be provided that the first recess and the further recess have a symmetrical design with respect to a mirror symmetry axis of the circuit board.

A symmetrical configuration of the recesses and of the positioning of the provided communication device requires symmetrical propagation of the electromagnetic properties of the antennas of the provided communication device, so that the electromagnetic properties of the provided communication device have periodic, in particular symmetrical, behavior.

It may be further provided that the first copper layer includes a communication module ground that forms a ground plane of the communication module, the communication module ground being spaced apart, at least in areas, from the first ground plane and the further ground plane by means of gaps.

Gaps between the communication module ground and the ground planes of the particular antennas require an electromagnetic decoupling of the antennas from one another and in particular from the communication module, so that interfering influences on the antennas by the communication module are minimized.

It may be further provided that the communication module ground is electrically coupled to the first ground plane via a first ground line, and is electrically coupled to the further ground plane via a further ground line.

A surface area of the connecting lines, and thus, a strength of the electromagnetic coupling between the communication module and the antennas, is minimized by a separate connection or electrical coupling of the communication module ground to the ground planes of the particular antennas.

It may be further provided that the gaps have a width between 2% and 11% of a diameter of the particular recess.

Gaps having a width between 2% and 11% of a diameter of the particular recess have proven to be particularly suitable for minimizing electromagnetic interactions between the antennas and the communication module.

It may be further provided that the gaps in the Y-Z plane have the same width.

Gaps having the same width in the Y-Z plane enable a monotonic PDoA function when the antennas are embedded in the communication device.

It may be provided in particular that the first ground plane can be electromagnetically decoupled from the further ground plane via a gap.

A gap, i.e., a planar spacing between the ground planes of the antennas, may be easily provided, and enables reliable decoupling of the electromagnetic properties of the antennas.

It may be further provided that the omnidirectional radiation behavior of the communication device has an antenna gain greater than or equal to −10 dBi in all spatial directions, and/or that the reflection factor of the communication device at the excitation structures is less than or equal to −6 dB.

In particular, the provided communication device may be used in a frequency range from 6.25 GHz to 8.25 GHz, and enables a monotonic PDoA function in the incidence angle range of approximately +/−60° and greater for any given polarization directions of a linearly polarized incident radio wave.

It may be provided that the communication module is an ultrawide band module that includes two receivers with two separate antenna connections, and that is configured to measure a phase difference of the antenna signals between the two antenna connections, and for a distance that is less than or equal to one-half the wavelength of a particular radio signal, to determine a direction of the incident radio signal based on a phase difference between particular reception signals, the phase difference of the two reception signals, as a function of an incidence angle of the radio signal, being a monotonically rising or falling function of the incidence angle and being independent of a polarization direction of the incident radio signal.

According to a second aspect, the present invention relates to a vehicle, the vehicle including one possible embodiment of the provided communication device.

By use of the communication device, the vehicle can determine, for example, a position of a radio key or of a mobile telephone of a user of the vehicle, so that, for example, a processing unit of the vehicle can determine whether the radio key or the mobile telephone is inside or outside the vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
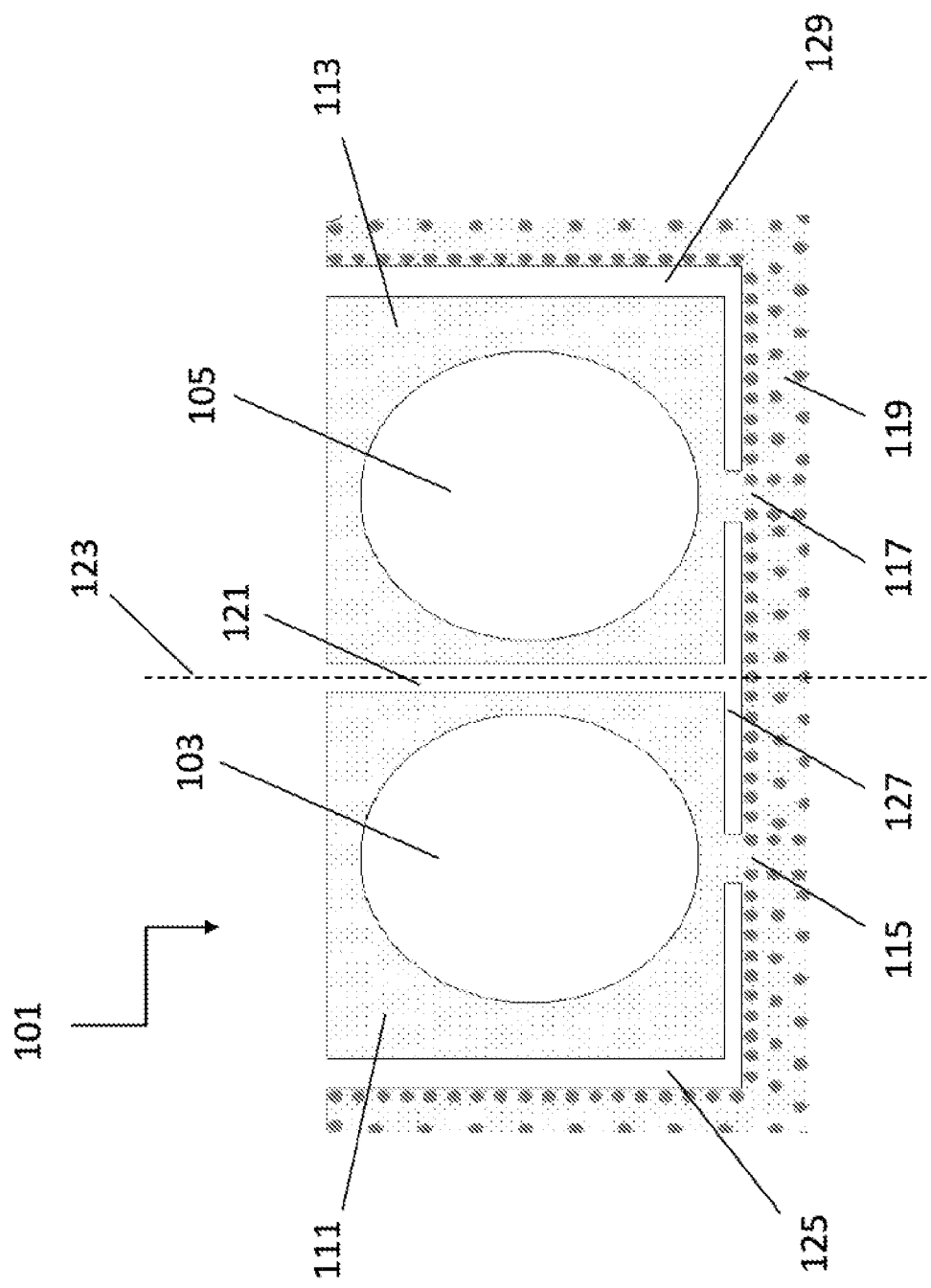
FIG. 1 shows a top view of a first copper layer according to one possible embodiment of the provided communication device.
Figure 3:
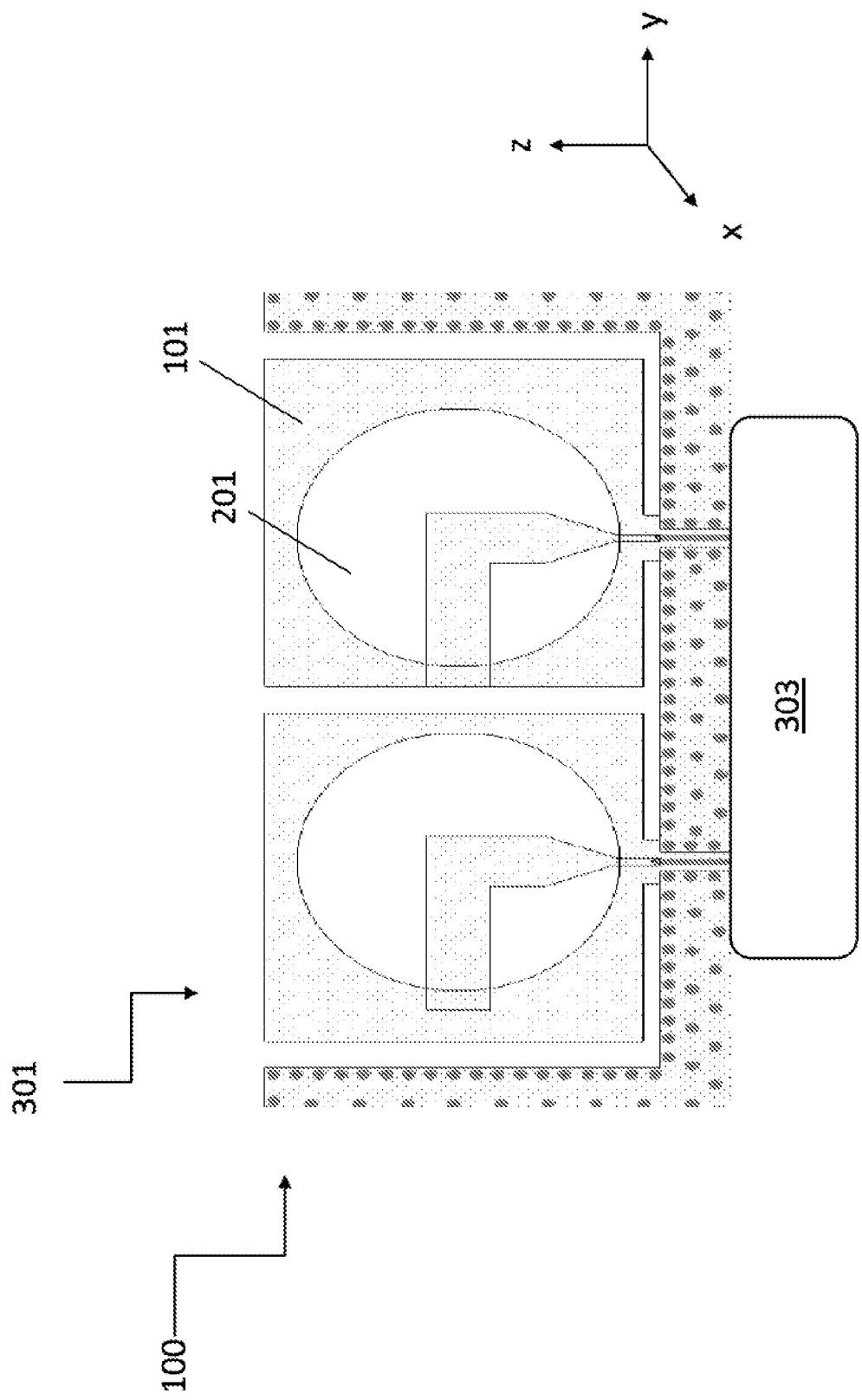
FIG. 3 shows a top view of the communication device according to FIGS. 1 and 2.

A first copper layer 101 is illustrated in FIG. 1. The copper layer 101 is part of a circuit board 301 of one possible embodiment of the provided communication device as illustrated in FIG. 3, for example.

Figure 2:
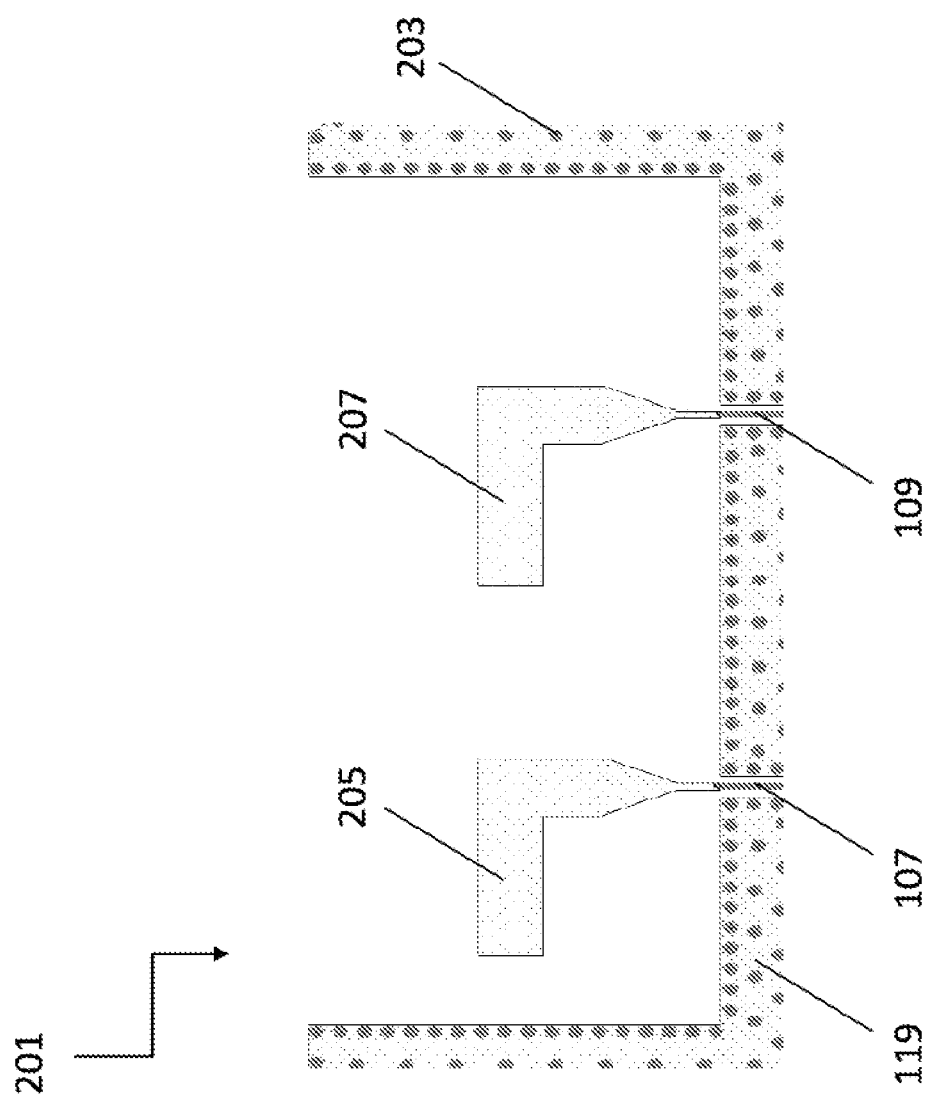
FIG. 2 shows a top view of a second copper layer of the communication device according to FIG. 1.

Recesses 103 and 105 are formed in the copper layer 101, and for emitting or receiving circularly polarized waves may be excited by means of an excitation structure 205 or 207, respectively, as illustrated in FIG. 2.

Together with the excitation structures 205 and 207, the recesses 103 and 105 as well as connecting lines to a communication module form antennas.

The antennas are connected to a communication module ground 119 of the communication module via ground connections 115 and 117.

A diameter of the recesses 103 and 105 is selected appropriately for the wavelength range, in particular 6.25 GHz to 8.25 GHz, corresponding to a UWB signal, in the present case 1.45 cm, for example.

For an unambiguous measurement of the incidence angle, the spacing of the phase centers or of the midpoints of the two recesses 103 and 105 is designed to be less than or equal to the shortest wavelength of the UWB signal, in the present case 3.6 cm/2=1.8 cm, for example.

For an unambiguous measurement of the incidence angle, the spacing of the phase centers or of the midpoints of the two antenna holes is designed to be less than or equal to the shortest wavelength of the UWB signal, in the present case. 3.6 cm/2=1.8 cm, for example.

To achieve a monotonic PDoA function when the antennas are embedded in the communication device, the ground planes 111 and 113 of the two antennas are separated from one another, i.e., spaced apart, by a slot or gap 121 in order to provide the best possible electromagnetic decoupling of the two antennas from one another.

In addition, the recesses 103 and 105 of the two antennas are situated symmetrically with respect to a mirror symmetry axis 123 of the first copper layer 101.

To reduce the influence of the communication module ground 119, the ground planes 111 and 113 of the two antennas are separated from the communication module ground 119 by gaps 125, 127, and 129.

The gaps 125, 127, and 129 are designed with a width of approximately 3% to 11% of the diameter of the recesses 103 and 105.

Furthermore, to improve the symmetry in the Y-Z plane, the two gaps 125 are designed with the same width, and the two recesses 103 and 105 are electromagnetically decoupled from one another via a slot 121.

FIG. 2 illustrates a second copper layer 201 which together with the first copper layer 101 according to FIG. 1 forms a circuit board 301 according to FIG. 3.

Since the circuit board includes at least two copper layers 101 and 201, shared ground planes on the various copper layers 101 and 201 are electroconductively connected to one another by a plurality of vias 203.

In addition, the excitation structures 205 and 207 and the communication module ground 119 are apparent in FIG. 2.

The respective ground planes 111 and 113 of the two antennas are connected to the communication module 303 according to FIG. 3 via narrow connecting lines 107 and 109, overlapping with the ground connections 115 and 117.

FIG. 3 illustrates a circuit board 301 that includes the first copper layer 101 illustrated in FIG. 1, and the second copper layer 201 illustrated in FIG. 2.

The circuit board 301 together with a communication module 303 forms a communication device 100.

The following results may be achieved with the communication device 100:

Frequency range: 6.25 to 8.25 GHz

Omnidirectional radiation behavior with antenna gain in all spatial directions: greater than or equal to −10 dBi Reflection factor at the excitation structures: less than or equal to −6 dB Monotonic PDoA function in the incidence angle range of approximately +/−60° and greater for any given polarization direction of a linearly polarized incident wave.

Figure 4:
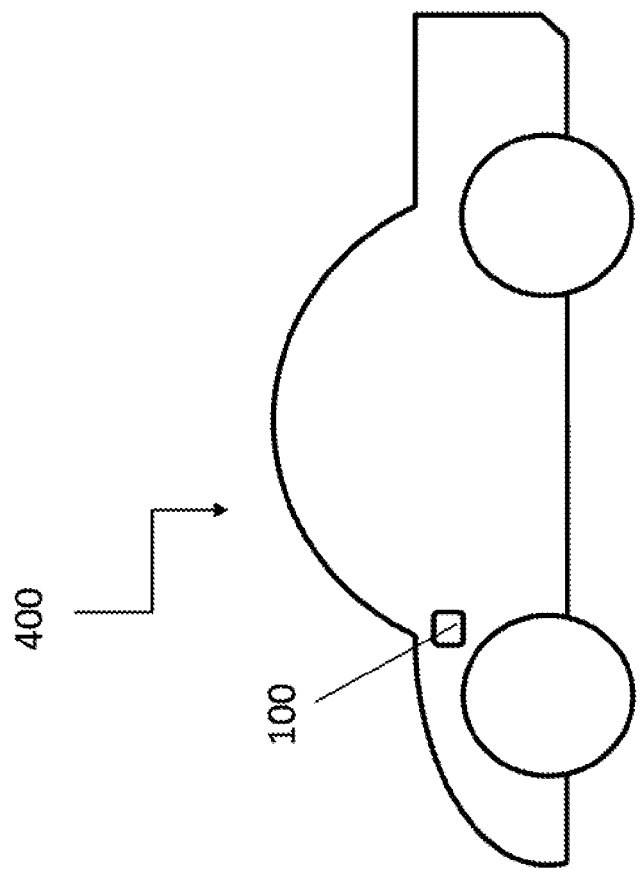
FIG. 4 shows a vehicle that includes a corresponding communication device.

FIG. 4 shows a vehicle 400 that includes a corresponding communication device 100.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A communication device to determine a position of a communication partner, the communication device comprising:
 a first circular antenna;
 at least one further circular antenna;
 a circuit board having at least one first copper layer and a second copper layer; and
 a communication module arranged at the circuit board,
 wherein the first circular antenna has a first recess that is formed in the first copper layer, a first ground plane, and a first excitation structure,
 wherein the at least one further circular antenna has a further recess that is formed in the first copper layer, a further ground plane, and a further excitation structure,
 wherein the first ground plane is spaced apart from the further ground plane in order to electromagnetically decouple the first circular antenna from the at least one further circular antenna, and
 wherein the first circular antenna is electrically coupled to the communication module via a first connecting line formed in a first area of the copper layer, and
 wherein the at least one further circular antenna is electrically coupled to the communication module via a further connecting line formed in a further area of the second copper layer.

2. The communication device according to claim 1, wherein the first recess and the further recess have a symmetrical design with respect to a mirror symmetry axis of the circuit board.

3. The communication device according to claim 1, wherein the first copper layer includes a communication module ground that forms a ground plane of the communication module, the communication module ground being spaced apart, at least in areas, from the first ground plane and the further ground plane via gaps.

4. The communication device according to claim 3, wherein the communication module ground is electrically coupled to the first ground plane via a first ground line, and is electrically coupled to the further ground plane via a further ground line.

5. The communication device according to claim 3, wherein the gaps have a width between 2% and 11% of a diameter of the particular recess.

6. The communication device according to claim 3, wherein the gaps in the Y-Z plane have the same width.

7. The communication device according to claim 3, wherein the first ground plane is electromagnetically decoupled from the further ground plane via a gap.

8. The communication device according to claim 1, wherein the communication device has an omnidirectional antenna gain greater than or equal to −10 dBi in all spatial directions.

9. The communication device according to claim 1, wherein a reflection factor at the excitation structures is less than or equal to −6 dB.

10. The communication device according to claim 1, wherein the communication module is an ultrawide band module that includes two receivers with two separate antenna connections, and that is configured to measure a phase difference of the antenna signals between the two antenna connections, and for a distance that is less than or equal to one-half the wavelength of a particular radio signal, to determine a direction of the incident radio signal based on a phase difference between particular reception signals, the phase difference of the two reception signals, as a function of an incidence angle of the radio signal, being a monotonically rising or falling function of the incidence angle and being independent of a polarization direction of the incident radio signal.

11. A vehicle comprising at least one communication device according to claim 1.

* * * * *